June 13, 1933.  C. F. KETTERING ET AL  1,913,887
MOTOR STARTING DEVICE
Filed June 13, 1927   2 Sheets-Sheet 1

Inventor
Charles F. Kettering
Orin E. Marvel
By Marchal and Noe
Attorney

June 13, 1933.    C. F. KETTERING ET AL    1,913,887
MOTOR STARTING DEVICE
Filed June 13, 1927    2 Sheets-Sheet 2

Inventor
Charles F. Kettering
Orin E. Marvel
By Maréchal and Noe
Attorney

Patented June 13, 1933

1,913,887

UNITED STATES PATENT OFFICE

CHARLES F. KETTERING AND ORIN E. MARVEL, OF DAYTON, OHIO; SAID KETTERING ASSIGNOR TO DELCO-LIGHT COMPANY, OF DAYTON, OHIO, A CORPORATION OF DELAWARE, AND SAID MARVEL ASSIGNOR, BY MESNE ASSIGNMENTS, TO NORTH EAST APPLIANCE CORPORATION, OF ROCHESTER, NEW YORK, A CORPORATION OF NEW YORK

MOTOR STARTING DEVICE

Application filed June 13, 1927. Serial No. 198,441.

This invention relates to refrigerating apparatus including prime moving means for actuating the same.

One of the objects of this invention is to so construct and interrelate the compressor, prime mover, driving connections and controls of such an apparatus as to effect economies in the cost of manufacture and to secure simplification in the operation thereof.

Another object is to provide as a prime mover in such an apparatus, an electric motor having so called split-phase characteristics so constructed, controlled and related to the parts driven thereby as to start said apparatus and maintain the same in operation with a relatively low maximum or peak current demand upon the supply line.

Other objects and advantages of the invention will appear from the following description and in the drawings in which one embodiment of the invention is set forth.

Referring to these drawings, Fig. 1 is a diagrammatic representation of a refrigerating apparatus embodying the present invention;

Figure 1:
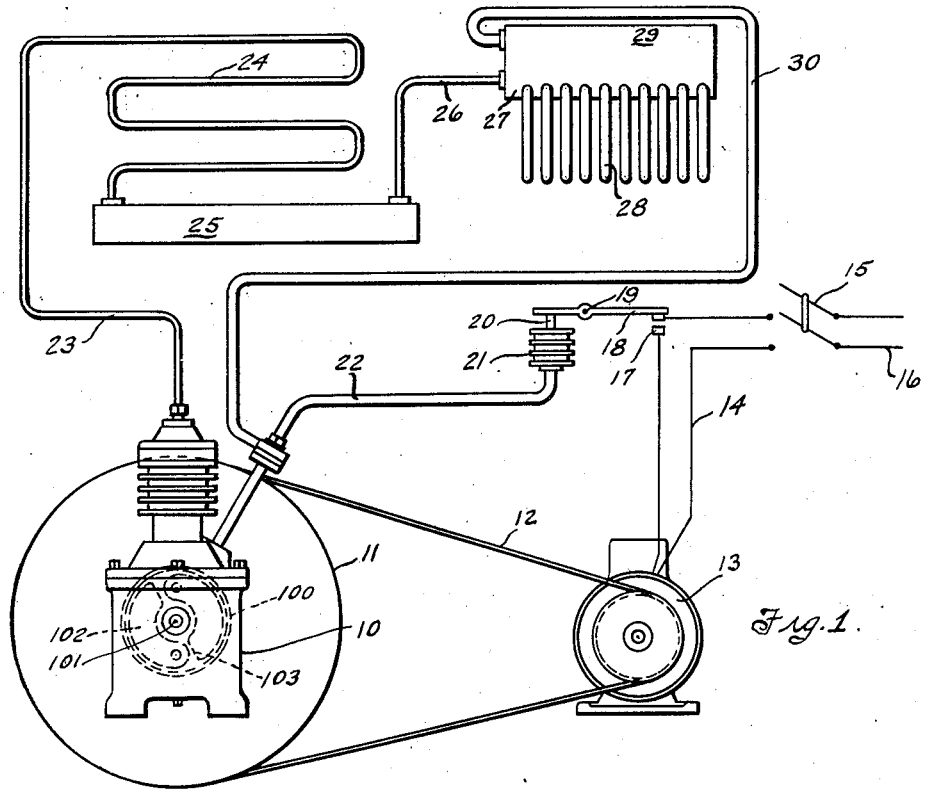

Referring now to the accompanying drawings by reference numerals in which corresponding numbers indicate like parts in the various figures, a vapor compressor 10 of a refrigerating system is shown as provided with a fly-wheel 11 driven through belt 12 from a prime mover 13. This prime mover herein shown as an electric motor, is connected by means of the wires 14 to a switch 15 which may be manually operated to connect the refrigerating apparatus to a suitable source of alternating current indicated at 16. In one of the wires 14 is provided a pair of contacts 17 which may be closed automatically by means of the lever 18 pivoted in any suitable manner as at 19 and controlled by the plunger 20 of a pressure responsive device 21 which is provided in the refrigerating system. The pressure responsive device 21 is shown connected by the pipe 22 to the intake side of the compressor 10. This compressor when in operation supplies high pressure refrigerant vapor through the supply pipe 23 to the condenser 24 to which is connected the receiver 25 which collects the liquid refrigerant and supplies it through the pipe 26 to the evaporator 27 which may be provided with refrigerant conduits 28 to facilitate cooling. The liquid refrigerant evaporates in the evaporator 27, filling the space 29 in the upper part thereof. This space 29 of the evaporator is connected by the suction line 30 to the intake side of the compressor and to the branch pipe 22 leading to the pressure responsive means by which the motor is automatically connected to the source of supply.

As the pressure within the space 29 and the pipe 30 increases due to the evaporation of the liquid refrigerant the compressor being then in a state of rest, the pressure exerted on the plunger 20 increases and at a predetermined definite pressure the contacts 17 are automatically closed by the operation of the plunger 20 so as to start the operation of the motor which has previously been connected by the manually operable switch 15 to a source of electric power. The compressor being driven by the motor will then withdraw vapor from pipe 30 and space 29 of the evaporator, compress the same, and then discharge the compressed fluid into the condenser coils again.

As is understood, the pressure varies generally in accordance with the variations in temperature of the refrigerant, in the low pressure side of the refrigerating apparatus, and accordingly, when the refrigerator has attained the proper low temperature, the pressure of the refrigerant on the low pressure side of the system will have been decreased accordingly, and this decrease in pressure is taken advantage of to operate the plunger 20 of the pressure responsive device 21, thereby disconnecting the motor 13 from the source of current 16 and stopping the compressor. From the foregoing it will be apparent that the motor is controlled automatically in accordance with temperature changes of the refrigerating apparatus to maintain some predetermined range of temperature.

As a result of the foregoing relation between the temperature and pressure of the refrigerant it will be seen that in the cyclic operation of the refrigerating apparatus, the pressure of the refrigerant on the low pressure side of the apparatus at the time the motor is stopped is comparatively low when the temperature is at the low limit of temperature variation. As the refrigerator warms up, there is a gradual and corresponding increase of the refrigerant pressure in the evaporator 27 and other parts of the low pressure side of the apparatus until, when the apparatus reaches the high temperature at which the motor is again placed in operation, the refrigerant pressure will be a maximum. Likewise, the load upon the compressor and motor at the time of starting will be a maximum.

An undesirable result that follows from the adverse conditions of starting just mentioned, namely, starting a refrigerating apparatus under maximum load, is that the motor must be capable of developing high torque when starting if connected to the compressor at the time of starting. A motor of this type is necessarily expensive and of a complicated nature, and not easily attainable in an inexpensive motor adapted to operate on single-phase alternating current. An important feature of this invention, therefore, is the reduction in cost of the refrigerating apparatus by the use of an inexpensive motor which at the same time has the advantage that it is simpler and more efficient in operation than the prior motor constructions, and which at the same time is capable of putting the compressor into operation without causing excessive current demand on the line. One way in which this is accomplished is by causing the motor to be started while disconnected from the compressor and then automatically connecting the two together by means of suitable clutch mechanism. The starting current of the motor itself is also limited by using a current-limiting device as will be presently described so that the demand upon the power line never exceeds some predetermined low value.

Figure 2:
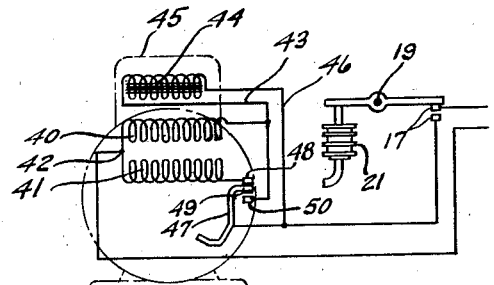
Fig. 2 is a diagrammatic representation of the electrical connections of the electric motor of the present invention.

The electric motor as shown in Fig. 2 is of the single-phase, alternating current, split-phase type and includes the main stator winding 40 which preferably has a high inductance, and the auxiliary starting stator winding 41 which preferably has a high resistance so that the currents in the two windings will be in the proper phase displacement to create a comparatively high starting torque. These two windings are connected together at the point 42 to one side of the line. The main winding 40 during the starting of the motor is connected through the conductor 43 to a current-limiting device such as a high impedance choke 44 which may be contained within a casing 45 on top of the motor. This high impedance choke is connected at its other end by means of the conductor 46 to a contact plate 47 which is connected to the other side of the line through the pair of contacts 17 which are controlled as previously stated by the pressure and temperature responsive device 21.

In the starting position of the contact plate 47 as shown in Fig. 2 the main winding 40 of the stator of the motor is connected in series with the choke 44 and the current supplied from the line is thus maintained at a very low value through the main winding. The motor stator is provided with a second auxiliary starting winding 41, as previously stated, and the current supplied from the line to the auxiliary high resistance starting winding is preferably less than the main winding starting current. Sufficient starting torque is created to bring the squirrel-cage rotor with which the motor is provided up to a predetermined speed in a short time. During the starting of the motor the rotor is operating freely as it is not connected at this time to the load which it is to drive. The auxilary starting winding circuit through the winding 41 is completed through the two contacts 48 and 49, contact 49 being provided on the upper end of the contact plate 47. In the normal still position of the motor the plate 47 is located as shown in Fig. 2 and serves to connect the auxiliary starting winding 41 to the line and in this position the main stator winding is in series with the choke 44. After the motor has attained a predetermined speed the current limiting choke 44 will be short-circuited by the lowering of the plate 47 and the main winding 40 will then be directly connected to the line through the contacts 49 and 50. This operation will at the same time cut out the auxiliary starting winding 41 by opening its circuit so that the motor will operate as a single-phase induction motor after attaining a running speed.

Figure 7:
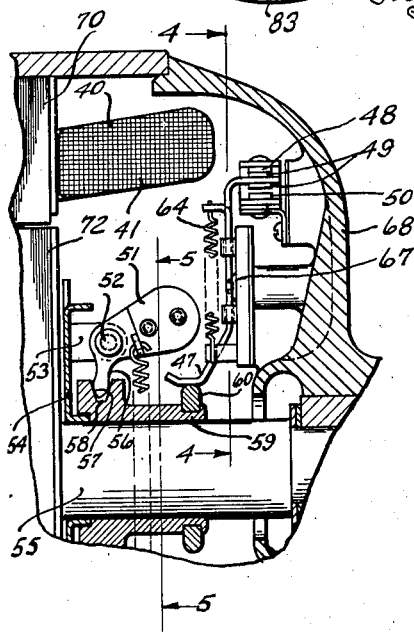
Fig. 7 is a vertical section through the speed-responsive controlling device of the motor.
Figure 4:
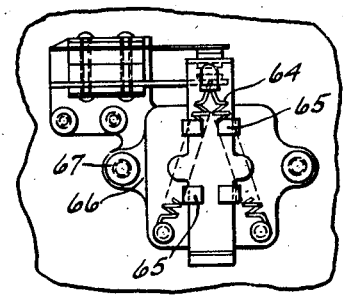
Fig. 4 is a detail side elevation of the speed-responsive switch.
Figure 5:
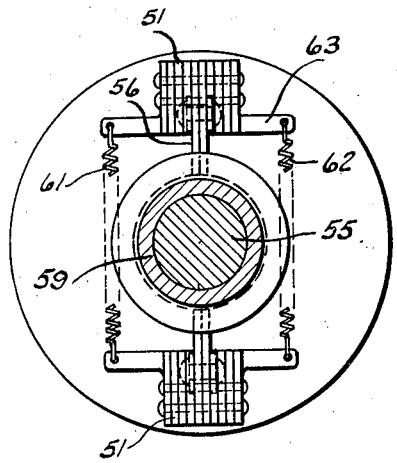
Fig. 5 is a vertical section on the line 5—5 of Fig. 7.

The contact plate 47 as shown in Fig. 7 is automatically controlled by centrifugally operated weighted arms 51. These arms, which may be two in number as shown in Fig. 5, are mounted on the pivots 52 provided on lugs 53 of the supporting plate 54 which is fixed to the rotor shaft 55 of the motor. The arms 51 are each provided with an inwardly extending operating cam face 56 which has opposed involute cam surfaces 57 operable on the rack tooth-shaped groove 58 provided in the sleeve 59 which is freely slidable along the shaft 55. This sleeve 59 at its outer end carries an insulating block 60 which maintains the contact plate 47 in the position shown in Fig. 7 when the motor is at rest. In this position the contact plate is raised and contact is made between the contact 49 on the upper end of the plate and the contact 48 connected to the auxiliary starting winding. A pair of springs 61 and 62 are connected to the projecting arms 63 of the weighted arms 51 and serve to connect the two weighted arms together so as to yieldingly hold them in the position as shown in Fig. 7. After the rotor has attained a certain predetermined speed the weighted arms 51 will be moved outwardly by the action of centrifugal force against the tension of the springs 61 and 62 and the sleeve 59 will be moved to the right. This permits the contact plate 47 to be lowered inwardly after the insulating ring 60 has been moved out of its path. A pair of springs 64 normally urge the plate 47 inwardly so that when the motor is operating at normal speed the plate 47 will cause the two contacts 49 and 50 to be yieldingly held together and good contact maintained by these springs. The plate 47 is guided by the ears 65 which project from the supporting plate 66, this plate 66 being firmly attached in place by means of the screws 67 to an end wall 68 of the motor. The plate 47 will thus be moved radially outwardly between the guiding ears 65 as the rounded face of the insulating ring 60 rides along the sloping lower cam faces of the plate 47.

Figure 3:
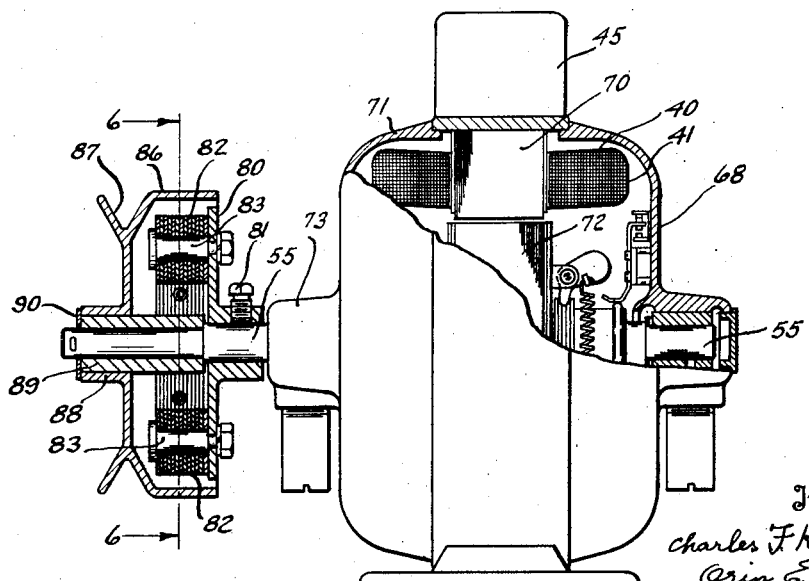
Fig. 3 is a side elevation partly in section of the motor and the clutch mechanism employed in cooperation therewith.
Figure 6:
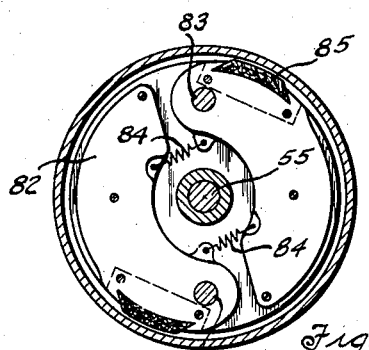
Fig. 6 is a vertical section on the line 6—6 of Fig. 3.

The windings 40 and 41 of the stator of the motor are indicated in Fig. 3 as surrounding the iron core portion 70 which is provided within the motor case 71. The squirrel-cage rotor 72 rotates within the core portion 70 and is fixed on the shaft 55. A rotor of this type will operate at a maximum efficiency after the rotor has attained its normal operating speed.

The shaft 55 of the motor projects beyond the end bearing 73 and is there rigidly united to a clutch disc 80 by means of the set screw 81. This clutch disc 80 supports a pair of pivotal clutch members 82 by means of the pivots 83 which are provided on opposite sides of the central shaft 55. The two clutch members 82 are yieldingly connected by means of the springs 84 which connect the adjacent portions of the clutch members together on opposite sides of the shaft 55. Each clutch member 82 bears an inserted clutch face 85 of suitable clutch material which is adapted to be pressed against the inner side of the clutch drum 86 when the two clutch members 82 are thrown apart by the action of centrifugal force against the yielding connection of the springs 84. The clutch members are adapted to be so operated by centrifugal force at a definite predetermined speed and the clutch is so designed that the motor will be automatically connected to the driven clutch member 86 concomitantly with the acting of the contact plate 47 in cutting out the high inductance choke 44 and the auxiliary starting winding 41 and preferably an instant after the contact plate so operates. After the motor has nearly attained its normal speed of operation and is operating as a single-phase induction motor the centrifugally controlled friction clutch operates to connect the motor to the drum 86 which is connected by means of the groove 87 in the side of the clutch drum to the operating belt 12 by means of which the fly-wheel 11 of the compressor is driven. As will be understood the clutch drum 86 is provided with a bearing member 88 which is freely rotatable upon a bushing 89 upon the shaft 55, retaining means 90 preventing endwise motion of the clutch parts. The fly-wheel 11 may if desired be fixed to the air compressor main shaft, or as indicated in Fig. 1 it may be clutched automatically to a drum 100 provided on the air compressor shaft 101, by means of the centrifugally controlled clutch arms 102. The clutch 103 provided between the fly-wheel and the main shaft of the air compressor is similar in construction and operation to the clutch which connects the motor to the compressor fly-wheel, except that it is designed to operate at a slightly greater speed so that the inertia of the fly-wheel 11, belt 12 and driving drum 86 may be overcome before the compressor is connected to the fly-wheel.

It will now be apparent that the squirrel-cage motor may be started by the automatically controlled pressure temperature responsive means of the refrigerating device so as to maintain a predetermined temperature in the refrigerator. The initial starting current of the motor will be limited to a low value approximating and preferably not exceeding normal current value since the motor starts with but a small load and since it starts with the current limiting device in circuit with the main stator winding. After a certain predetermined speed has been attained the contact plate 47 is automatically controlled to cause the motor to operate as a normal induction motor. The speed at which the plate 47 operates is preferably somewhat less than the normal operating speed of the motor. Immediately after and at about the same speed of revolution of the rotor corresponding to the automatic operation of the current limiting device the friction clutch between the motor and the load automatically throws the load on the motor and does so in a smooth manner by means of the nonpositive friction drive between the driving and driven parts as they are brought into engagement. The engagement of the clutch causes practically no extra drain on the line current since the motor at the time of engagement of the clutch or clutches, is operating nearly at full speed and consequently is developing maximum torque. The squirrel-cage motor which is comparatively inexpensive and of simple construction will then operate efficiently to cause the compressor to again lower the temperature of the refrigerator to a predetermined value after which the pressure responsive device 21 will cut off the line supply of current to the motor.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In combination, in an automatically operating refrigerating device, a compressor, a fly-wheel therefor, a squirrel-cage alternating current motor, a main winding and an auxiliary starting winding for said motor, current limiting means for causing a decreased current to flow through said main winding during starting of the motor, centrifugal means for automatically disconnecting said current limiting means and cutting the starting winding out of circuit after the motor attains operating speed, a clutch between said motor and said fly-wheel adapted to be automatically operated to interconnect the motor and fly-wheel after said centrifugal means has operated, and a clutch between said fly-wheel and compressor adapted to interconnect the fly-wheel and compressor after the fly-wheel has been started.

2. In an automatically operating refrigerator device of the class described, in combination, an electric motor, a compressor adapted to be driven by said motor, a fly-wheel between the motor and the compressor, a clutch having provisions for automatically connecting the motor to the fly-wheel at a predetermined speed, and a clutch having provisions for automatically connecting the fly-wheel to the compressor at another speed substantially greater than said predetermined speed.

3. In a device of the character described, a motor having a stator including a starting winding and a running winding, current limiting means in series with said running winding and in parallel with said starting winding, a device for automatically disconnecting the starting winding and the current limiting means after the motor has been started, an element to be driven by said motor and having a fly wheel, clutch means for drivingly connecting said fly wheel and motor after said motor has been started and other clutch means connecting said fly wheel and element after the operation of said first named clutch means.

4. In a device of the character described, a motor having a stator including a starting winding and a running winding, current limiting means in series with said running winding and in parallel with said starting winding, a centrifugal means for disconnecting the starting winding and rendering the current limiting means inoperative, an element to be driven by said motor and having a fly wheel, clutch means for drivingly connecting said fly wheel and motor after said motor has been started and other clutch means connecting said fly wheel and element after the operation of said first named clutch means.

In testimony whereof we hereto affix our signatures.

CHARLES F. KETTERING.
ORIN E. MARVEL.